March 19, 1957    E. M. VERBAN ET AL    2,785,832
PASTE DISPENSER
Filed May 25, 1954
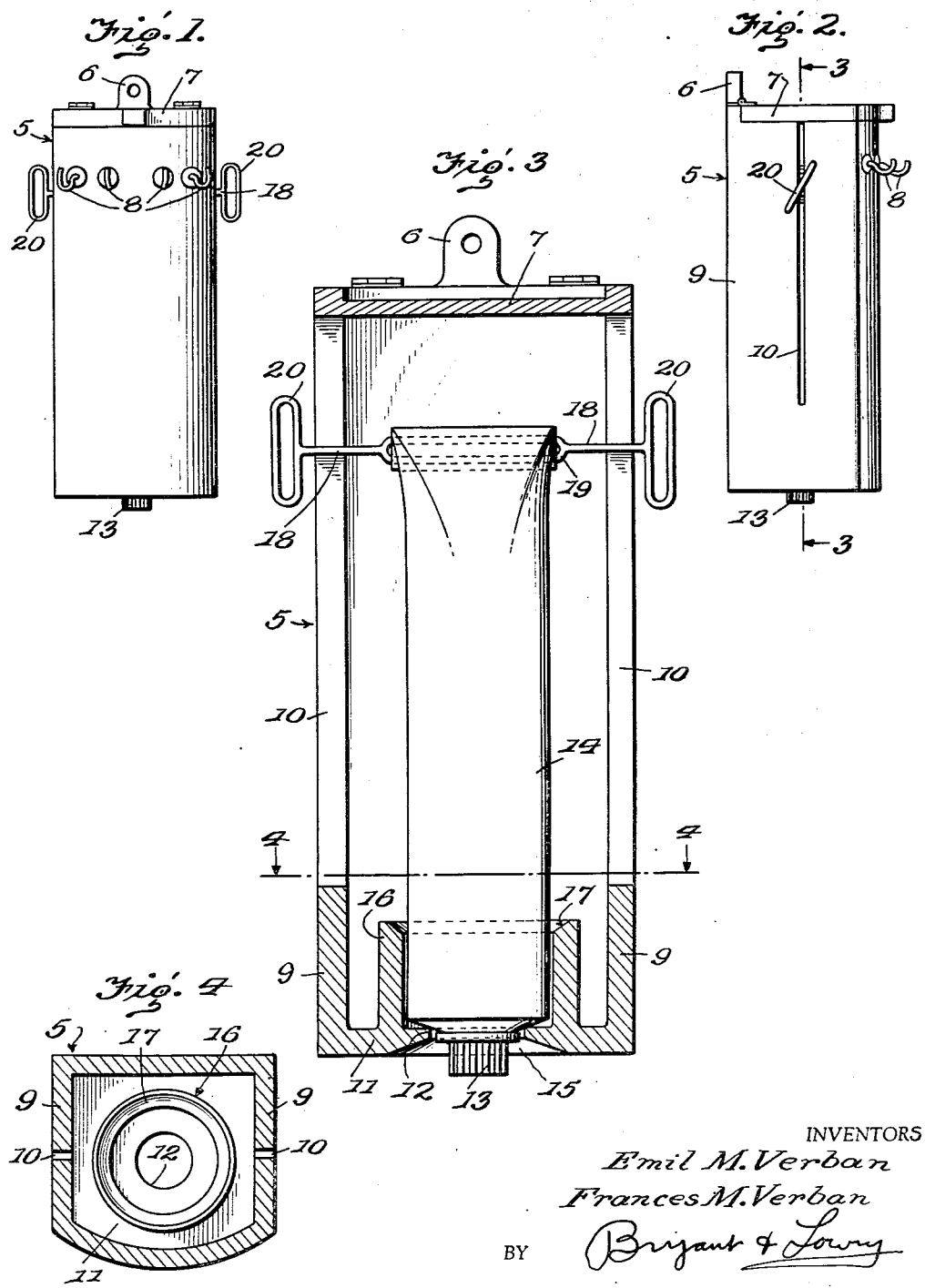
INVENTORS
*Emil M. Verban*
*Frances M. Verban*
BY *Bryant & Lowry*
ATTORNEYS

United States Patent Office 2,785,832
Patented Mar. 19, 1957

2,785,832

PASTE DISPENSER

Emil M. Verban, Elkhart, and Frances M. Verban, Lincoln, Ill.

Application May 25, 1954, Serial No. 432,154

1 Claim. (Cl. 222—100)

This invention relates to devices for dispensing tooth paste, shaving cream, facial and hand cream or the like from a conventional collapsible tube having a screw cap at one end.

More specifically, the invention relates to a holder and dispenser having a vertically elongated casing to receive the tube, an opening in the casing bottom through which the screw cap protrudes, slots in opposed walls of the casing, a winding shaft extending through said slots and engageable with the closed end of the tube, and handles on said shaft by means of which it may be rotated to gradually flatten and wind the tube on said shaft for extruding the tube contents.

One object of the invention is to provide a new and improved and exceptionally simple and inexpensive holder and dispenser of the type set forth.

A further object is to provide the casing bottom with a novel upstanding wall spaced around the opening which receives the screw cap of the tube, said wall serving to guide said screw cap into said opening without difficulty when inserting the tube.

A still further object is to provide the lower side of the casing bottom with a widely flared countersink around the aforesaid opening to allow easy engagement of the thumb and forefinger of one hand with the screw cap of the tube when removing and replacing said cap.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 is a front elevation;

Fig. 2 is a side elevation;

Fig. 3 is a vertical sectional view on line 3—3 of Fig. 2; and

Fig. 4 is a horizontal sectional view on line 4—4 of Fig. 3, the tube being omitted.

In the drawing above briefly described, the numeral 5 denotes a vertically elongated casing of plastic or other suitable material, said casing having a suspension lug 6 and a hinged cover 7. The casing front is preferably provided with hooks 8 upon which to hang tooth brushes, when the device is used to dispense tooth paste.

Opposed side walls 9 of the casing 5 are formed with vertical slots 10 normally closed at their upper ends by the cover 7. The casing bottom 11 is formed with an opening 12 through which the screw cap 13 of a collapsible tube 14 protrudes when said tube is placed in the casing, and the lower side of said bottom 11 is formed with a widely flared countersink 15 around said opening 12. This countersink receives the thumb and forefinger of one hand when removing or reapplying the screw cap 13 and permits turning of said cap without difficulty.

The casing bottom 11 is provided with an integral upstanding cylindrical wall 16 which is concentric with and spaced around the opening 12. The internal diameter of this wall is only slightly greater than the diameter of the tube 14 and said wall therefore effectively guides the screw cap 13 into the opening 12 when downwardly inserting the tube into the casing 5. The upper inner corner of the wall 16 is preferably bevelled somewhat as shown at 17 to further aid in guiding the tube 14 into place.

A winding shaft 18 is provided with a loop 19 to receive the usual closed flattened end of the tube 14. This shaft extends through the slots 10 and has suitable handles 20 at its ends. Rotation of the shaft gradually flattens the tube and winds it on said shaft to extrude the tube contents when the cap 13 is removed. As the tube shortens, the shaft 18 moves down in the slots 10.

In preparing the device for use, the loop 19 of the shaft 18 is engaged with the tube, the latter is downwardly inserted into the casing 5 and the shaft 18 is guided into the slots 10. The cover 7 is then closed and the device is ready for use. To extrude some of the paste, it is only necessary to remove the screw cap 13 and turn one of the handles 20. The cap 13 may then be easily replaced.

From the foregoing, it will be seen that a novel and advantageous device has been disclosed, but attention is invited to the possibility of making minor variations without departing from the spirit and scope of the invention as claimed.

We claim:

An improvement in a paste dispenser of the type in which the usual screw cap of a collapsible tube protrudes through an opening in the bottom wall of a casing containing the tube; said improvement comprising a cylindrical wall projecting upwardly within the casing from said bottom wall and integral therewith, said wall being concentric to said opening and being of an internal diameter slightly greater than the external diameter of said tube for receiving the lower end of the tube and guiding the screw cap into said opening, an inwardly directed annular flange at the bottom end of the cylindrical wall surrounding the bottom wall opening for supporting the tube, said wall being of a height to provide a guide for a substantial portion of the cylindrical wall of the tube at the discharge end thereof and to support and maintain the tube in alignment with the opening in the bottom wall of the casing, the lower side of said bottom wall being provided with a widely flared countersink in surrounding and concentric relation to said opening for receiving the thumb and forefinger of one hand when removing and applying the screw cap, a substantial portion of which is normally disposed above the lower surface of said bottom wall, and the upper free end of said wall being inwardly and downwardly beveled for guiding the tube into the wall.

References Cited in the file of this patent

UNITED STATES PATENTS

| 1,668,296 | Wells | May 1, 1928 |
| 2,586,922 | De Moss | Feb. 26, 1952 |